United States Patent
Yamamoto et al.

(10) Patent No.: US 7,284,645 B2
(45) Date of Patent: Oct. 23, 2007

(54) FLUID TRANSMISSION DEVICE

(75) Inventors: Yoshihisa Yamamoto, Shizuoka (JP); Tokuji Yoshimoto, Shizuoka (JP); Akira Kitajima, Shizuoka (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 248 days.

(21) Appl. No.: 11/157,158

(22) Filed: Jun. 21, 2005

(65) Prior Publication Data

US 2006/0000682 A1  Jan. 5, 2006

(30) Foreign Application Priority Data

Jun. 22, 2004 (JP) ............................. 2004-183319
Mar. 18, 2005 (JP) ............................. 2005-080200

(51) Int. Cl.
*F16H 41/24* (2006.01)

(52) U.S. Cl. ...................... 192/3.29; 192/112

(58) Field of Classification Search ................ None
See application file for complete search history.

(56) References Cited

U.S. PATENT DOCUMENTS

| | | | |
|---|---|---|---|
| 6,742,637 B2 * | 6/2004 | Ackermann | 192/3.29 |
| 6,758,315 B2 * | 7/2004 | Bauer et al. | 192/3.29 |
| 6,779,639 B2 * | 8/2004 | Sato et al. | 192/3.29 |
| 7,083,029 B2 * | 8/2006 | Seebacher et al. | 192/3.29 |

FOREIGN PATENT DOCUMENTS

JP  2004-239365  8/2004

* cited by examiner

*Primary Examiner*—Saul Rodriguez
(74) *Attorney, Agent, or Firm*—Arent Fox LLP.

(57) ABSTRACT

In a fluid transmission device, a male fitting surface of a periphery of a diameter-expanded portion of a pump shell is fitted to a female fitting surface of an inner circumference of a peripheral wall portion of a cylindrical transmission cover, and a fillet weld being is formed between an end surface of the peripheral wall portion and a peripheral surface of the diameter-expanded portion along an entire circumference, thereby connecting together the pump shell and the transmission cover. An annular recess is formed in an inner circumferential surface of the peripheral wall portion to adjoin the female fitting surface on the side opposite from the fillet weld. A portion of the transmission cover corresponding to the recess constitutes an annular thin-walled portion which has a thickness smaller than the portions of the transmission cover along the opposite sides of the annular thin wall portion. Therefore, even if the diameters of the pump shell and the transmission cover are increased, the durability of the pump shell and the transmission cover can be improved by alleviating excessive stress concentration on the fillet weld between the pump shell and the transmission cover.

9 Claims, 4 Drawing Sheets

FLUID TRANSMISSION DEVICE

RELATED APPLICATION DATA

The present invention is based upon Japanese priority application Nos. 2004-183319 and 2005-80200, which are hereby incorporated in their entirety herein by reference.

BACKGROUND OF THE INVENTION

1. Field of the Invention

The present invention relates to a fluid transmission device including a torque converter and a fluid joint which is used in an automobile and the like, and more particularly to an improvement in a fluid transmission device comprising: a turbine impeller; a pump impeller which is opposed to the turbine impeller so as to define a circulation circuit of a working oil between the pump impeller and the turbine impeller, and which has a pump shell including a diameter-expanded portion along a peripheral end portion; and a cylindrical transmission cover which defines an oil chamber in communication with the circulation circuit between the transmission cover and a back surface of the turbine impeller, a male fitting surface of a periphery of the diameter-expanded portion being fitted to a female fitting surface of an inner circumference of a peripheral wall portion of the cylindrical transmission cover, a fillet weld being formed between an end surface of the peripheral wall portion and a peripheral surface of the diameter-expanded portion along an entire circumference thereby connecting together the pump shell and the transmission cover.

2. Description of the Related Art

Such a fluid transmission device has already been disclosed, for example, in Japanese Patent Application Laid-open No. 2004-239365.

In recent years, for such a fluid transmission device, there has been a demand for an increase in load capacity corresponding to the high output of an engine, so that it has become necessary to increase the diameter of a fluid container comprising a pump shell and a transmission cover. However, when the size of the fluid container becomes large, a radial load which acts on the peripheral wall increase greatly due to an increase in centrifugal force and inner pressure, resulting in that excessive stress is likely to concentrate on a weld between the pump shell and the transmission cover. Therefore, it is conceivable to reduce the stress on the weld by increasing the plate thickness of the pump shell and the transmission cover to increase their rigidity. With this arrangement, however, the weight of the fluid container greatly increases, not only increasing the cost, but also lowering performance such as acceleration response.

SUMMARY OF THE INVENTION

The present invention has been achieved in view of the above-mentioned circumstances, and has an object to provide a fluid transmission device in which, although the diameter of a fluid container including a pump shell and a transmission cover is increased, the durability of the pump shell and the transmission cover can be improved by alleviating excessive stress concentration on a weld between the pump shell and the transmission cover without increasing their plate thickness.

In order to achieve the above-mentioned object, according to a first feature of the invention, there is provided a fluid transmission device comprising: a turbine impeller; a pump impeller which is opposed to the turbine impeller so as to define a circulation circuit of a working oil between the pump impeller and the turbine impeller, and which has a pump shell including a diameter-expanded portion along a peripheral end portion; and a cylindrical transmission cover which defines an oil chamber in communication with the circulation circuit between the transmission cover and a back surface of the turbine impeller, a male fitting surface of a periphery of the diameter-expanded portion being fitted to a female fitting surface of an inner circumference of a peripheral wall portion of the cylindrical transmission cover, a fillet weld being formed between an end surface of the peripheral wall portion and a peripheral surface of the diameter-expanded portion along an entire circumference thereby connecting together the pump shell and the transmission cover, wherein an annular recess is formed in an inner circumferential surface of the peripheral wall portion to adjoin the female fitting surface on the side opposite from the fillet weld, and wherein a portion of the transmission cover corresponding to the recess constitutes an annular thin-walled portion which has a thickness smaller than that of the portions of the transmission cover on the opposite sides of the annular thin-walled portion.

With the first feature, even when a large radial load due to centrifugal force and inner pressure is applied to the pump shell and the transmission cover, it is possible to efficiently alleviate excessive stress concentration on the fillet weld because the annular thin-walled portion deflects to an appropriate degree and stress is distributed from the fillet weld to the annular thin-walled portion. Therefore, the durability of the pump shell and the transmission cover can be improved without increasing their plate thickness.

Further, because a decrease in the wall thickness of the peripheral wall portion is small in the female fitting portion adjoining the annular thin-walled portion, the welding margin of the fillet weld can be sufficiently obtained, thereby increasing the strength of the fillet weld.

According to a second feature of the present invention, in addition to the first feature, the device further comprises an annular covering wall which covers the recess from the inner circumference side so as to define a pouched foreign matter trap which communicates with the oil chamber on a tip end side of the covering wall.

With the second feature, by using the recess as a foreign matter trap, it is possible to capture the foreign matter centrifugally separated from the working oil during the operation of the fluid transmission device.

According to a third feature of the present invention, in addition to the first feature, opposite inner side surfaces and bottom surface of the recess constitute a continuous curved surface.

With the third feature, by distributing stress over the whole annular thin-walled portion, it is possible to prevent a decrease in the strength of the thin-walled portion.

According to a fourth feature of the present invention, in addition to the second feature, an annular scraped-wall portion is formed along a peripheral surface of the covering wall to face the recess.

With the fourth feature, because an annular scraped-wall portion facing the recess is formed in the peripheral surface of the covering wall, it is possible to increase the volume of the foreign matter trap.

According to a fifth feature of the present invention, in addition to any one of the first to fourth features, a ring gear is fitted and welded to each other on an peripheral surface of the peripheral wall portion between the annular thin-walled portion and a sidewall portion of the transmission cover.

With the fifth feature, it is possible to use the peripheral wall portion as a mounting portion for the ring gear and to prevent the thermal distortion of the annular thin-walled portion due to the welding of the ring gear.

According to a sixth feature of the present invention, in addition to the fifth feature, a driving plate connected to a crankshaft of an engine is connected to the ring gear.

According to a seventh feature of the present invention, in addition to the first feature, the turbine impeller further includes a turbine hub to which an output shaft coaxial with the crankshaft is connected; the transmission cover further includes a cover hub coaxial with the output shaft; a crutch oil chamber is defined between the turbine impeller and the transmission cover to communicate with the circulation circuit; a lockup clutch is disposed in the crutch oil chamber and includes: an annular driving friction surface formed on an inner sidewall peripheral portion of the transmission cover; a crutch piston which has a piston hub rotatably and axially slidably supported on the turbine hub of the turbine impeller, and an annular sidewall portion having an annular follower friction surface that is formed on its inner surface and that can engage with and disengage from the driving friction surface; and a torque damper which has a plurality of damper springs annularly arranged to adjoin the annular sidewall portion of the crutch piston and which provides a shock-absorbing connection between the crutch piston and the turbine impeller; the transmission cover further includes a conical sidewall portion which connects together the annular sidewall portion having the driving friction surface formed thereon and the cover hub and which comes closer to the turbine impeller in a direction from the annular sidewall portion to the cover hub; and an outer side surface of the conical sidewall portion defines a conical recess for receiving an end of the crankshaft.

With the seventh feature, a conical sidewall portion connecting together the annular sidewall portion having the driving friction surface formed thereon and the cover hub, is provided and there is no annular step therebetween. Therefore, even in a case where a transmission cover is formed to have a large diameter in order to accommodate a large-capacity lockup clutch and a torque damper, the transmission cover obtains a high pressure resistance, thereby minimizing the axial swelling deformation of the transmission cover due to the interior high oil pressure and to effectively avoid stress concentration.

Further, because a conical recess which receives the end portion of the crankshaft is defined by the outer surface of the conical sidewall portion, it is possible to shorten the axial dimension of an assembly of the fluid transmission device and the engine, thereby contributing to the compact design of the assembly.

According to an eighth feature of the present invention, in addition to the seventh feature, the crutch piston further includes a conical sidewall portion which connects together the annular sidewall portion having the driving friction surface formed thereon and the cover hub and which has a conical angle substantially same as that of the conical sidewall portion of the transmission cover.

With the eighth feature, it becomes possible to dispose the transmission cover along with the clutch piston as close to the turbine impeller as possible, thereby permitting the compact design of the torque converter.

According to an ninth feature of the present invention, in addition to the seventh or eighth feature, a diameter of an annular arrangement circle connecting centers of the plurality of annularly arranged damper springs is larger than an outer diameter of the turbine impeller.

With the ninth feature, in the inner side of the peripheral portion of the transmission cover, it is possible to install a large-capacity torque damper in which the annular arrangement circle connecting the centers of the annularly arranged plural damper springs has a diameter larger than the outer diameter of the turbine impeller so that the connection shock of the lockup clutch is effectively absorbed, thereby contributing greatly to an improvement in the riding comfort of a vehicle.

Incidentally, the above-mentioned fluid transmission device corresponds to a torque converter T in an embodiment of the present invention, which will be described later.

The above-mentioned object, other objects, characteristics, and advantages of the present invention will become apparent from an explanation of a preferred embodiment, which will be described in detail below by reference to the attached drawings.

DESCRIPTION OF THE PREFERRED EMBODIMENT

A preferred embodiment of the present invention will be described below on the basis of the accompanying drawings.

Figure 1:
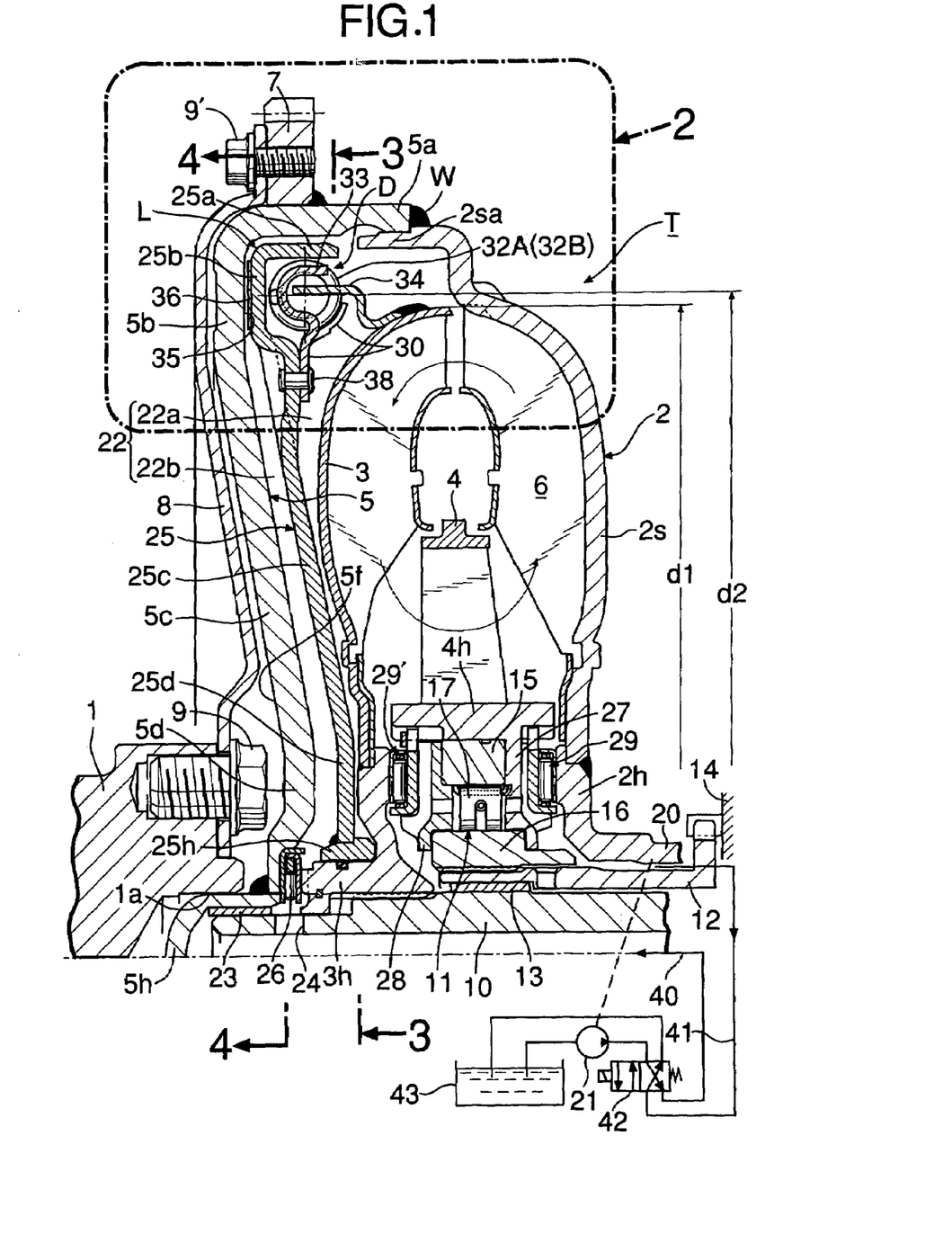
FIG. 1 is a longitudinal sectional view of the upper half of a torque converter for automobile according to an embodiment of the present invention.

In FIG. 1, a torque converter T for automobile comprises: a pump impeller 2; a turbine impeller 3 provided to be opposed to the pump impeller; and a stator impeller 4 disposed between the inner circumferential portions of the impellers 2 and 3. A circulation circuit 6 for power transmission by a working oil is defined between these impellers 2, 3, 4. A transmission cover 5 which covers the outer surface of the turbine impeller 3 is connected to the shell of the pump impeller 2, i.e., the pump shell 2s, as follows.

Figure 2:
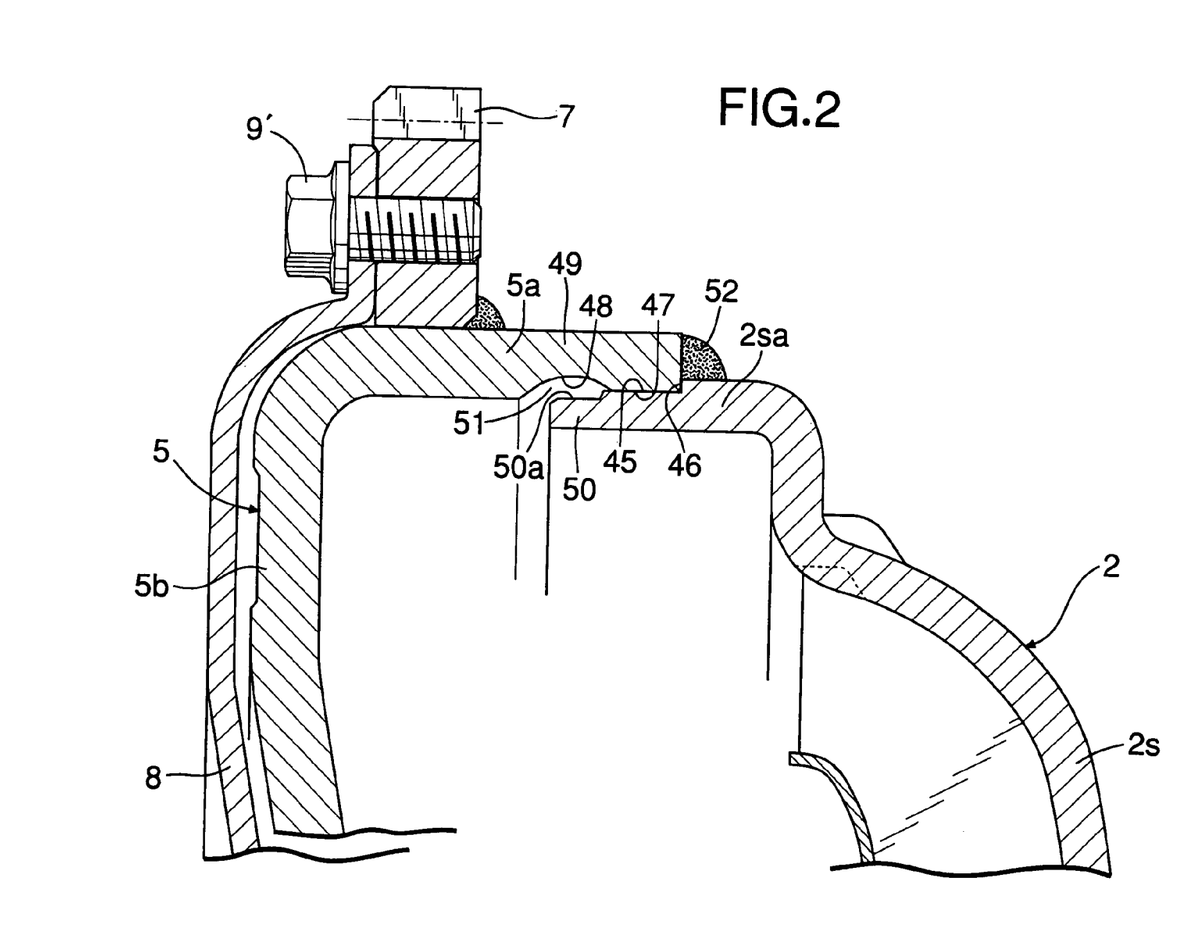
FIG. 2 is an enlarged view of Part 2 of FIG. 1.

As shown in FIG. 2, the pump shell 2s integrally includes a cylindrical diameter-expanded portion 2sa which extends radially outward from the peripheral end thereof to cover the peripheral surface of the turbine impeller 3. Formed at the periphery of the diameter-expanded portion 2sa, are a male fitting surface 45 and an annular positioning step 46 which rises from the inner end of the male fitting surface 45. On the other hand, the transmission cover 5 has a plate thickness larger than that of the pump shell 2s, and includes a cylindrical peripheral wall portion 5a which opens on the diameter-expanded portion 2sa side. Formed at the inner circumference of the peripheral wall portion 5a, are a female fitting surface 47 leading to the outer end of the peripheral wall portion and an annular recess 48 adjoining the inner end of the female fitting surface 47. The part of the peripheral wall portion 5a corresponding to the recess 48 constitutes an annular thin-walled portion 49 having a wall thickness smaller than that of the portions of the transmission cover on the opposite sides of the annular thin wall portion 48. The two side surfaces and bottom surface of the recess 48 constitute a continuous curved surface.

In connecting the pump shell 2s and the transmission cover 5 together, the male connecting surface 45 of the diameter-expanded portion 2sa of the pump shell 2s and the female fitting surface 47 of the peripheral wall portion 5a of the transmission cover 5 are fitted to each other, whereby the tip end surface of the peripheral wall surface 5a abuts against the positioning step 46 of the diameter-expanded portion 2sa. Thereafter, a fillet weld 52 is formed along the whole circumference between the tip end surface of the peripheral wall portion 5a and the peripheral surface of the diameter-expanded portion 2sa. In this way, the pump shell 2s and the transmission cover 5 are connected to each other.

In the diameter-expanded portion 2sa, a cylindrical covering wall 50 is provided to cover the recess 48 from the inner circumference side, with the interior thereof serving as a foreign matter trap 51. The foreign matter trap 51 communicates with the interior of the transmission cover 5 at the tip end side of the covering wall 50.

Figure 4:
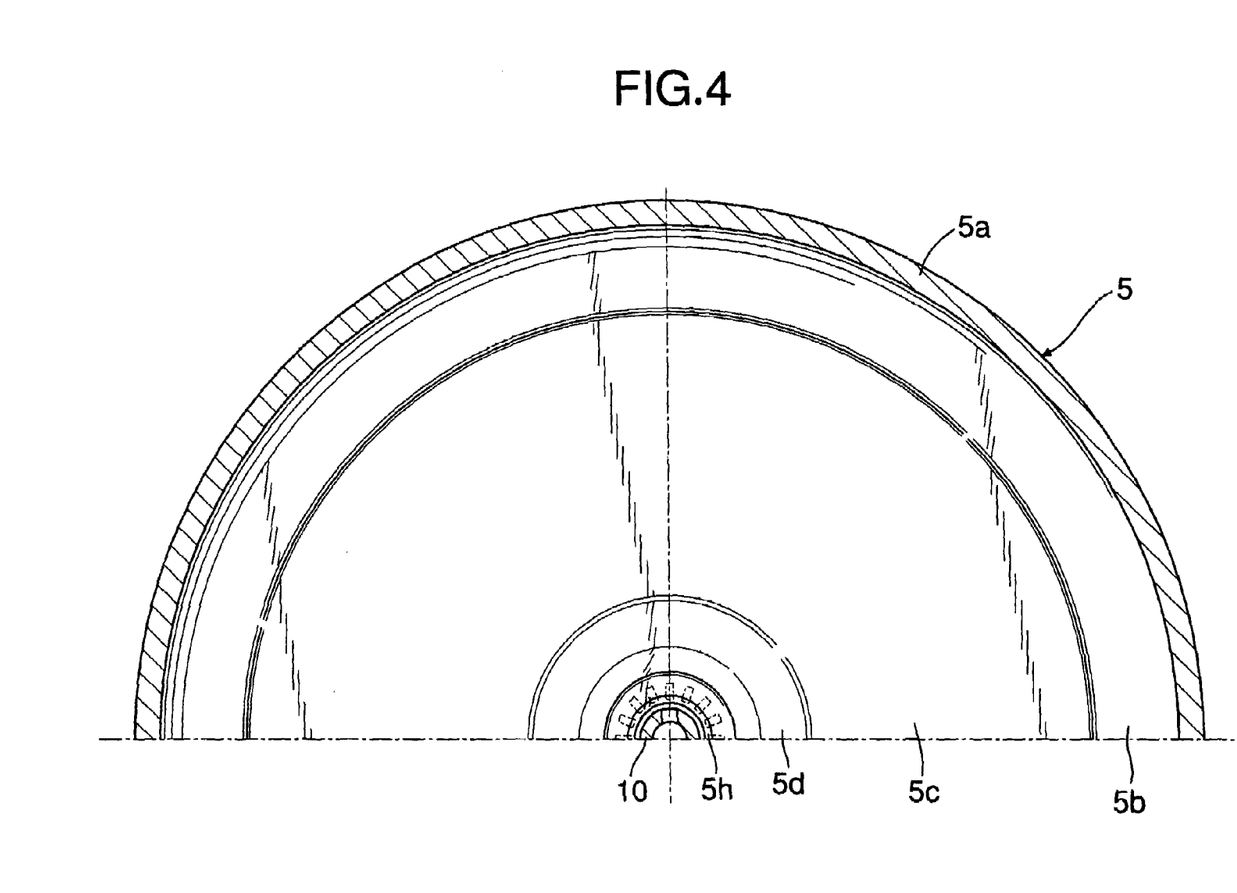
FIG. 4 is a sectional view taken along the line 4-4 of FIG. 1.

As shown in FIGS. 1 and 4, the transmission cover 5 includes: a peripheral annular sidewall portion 5b which is bent at a right angle radially inward from the outer end of the peripheral wall portion 5a; a conical sidewall portion 5c which comes close to the turbine impeller 3 side from the inner circumferential end of the peripheral annular sidewall portion 5b toward the center side; an inner circumferential annular sidewall portion 5d which extends radially inward from the inner circumferential end of the conical sidewall portion 5c, in parallel to the peripheral annular sidewall portion 5b; and a cap-shaped cover hub 5h which is connected by welding to the inner circumferential end of the inner circumferential annular sidewall portion 5d. The conical sidewall portion 5c has no annular step in the middle portion. The cover hub 5h is disposed in such a manner that the closed tip end portion thereof protrudes axially outward from the outer surface of the peripheral annular sidewall portion 5b.

The inner surface of the peripheral annular sidewall portion 5b of the transmission cover 5 is formed as an annular driving friction surface 35 by cutting. In the outer surface of the transmission cover 5, a conical recess 5f enclosing the cover hub 5h is defined by the conical sidewall portion 5c.

A starting ring gear 7 is fitted and welded to the peripheral surface of the peripheral wall portion 5a of the transmission cover 5 between the annular thin-walled portion 49 (see FIG. 2) and the peripheral annular sidewall portion 5b. A driving plate 8 is connected by a bolt 9 to the end surface of a crankshaft 1 of the engine, and then firmly fixed by a blot 9' to the ring gear 7. The driving plate 8 is formed so as to be positioned generally along the outer surface of the transmission cover 5. The end portion of a crankshaft 1 and the head of the bolt 9 are received by the recess 5f of the outer surface of the transmission cover 5. In particular, the head of the bolt 9 is disposed in the deepest part of the recess 5f. A pouched positioning hole 1a is provided in the end surface of the crankshaft 1, and the cover hub 5h is fitted into the positioning hole 1a.

A thrust needle bearing 26 is interposed between the hub of the turbine impeller 3, i.e., the turbine hub 3h and the transmission cover 5.

In the central part of the torque converter T, an output shaft 10 is disposed coaxially with the crankshaft 1. The output shaft 10 serves as the main shaft of a multistage transmission which is not shown. The turbine hub 3h is spline-fitted to the output shaft 10. The end portion of the output shaft 10 is rotatably supported by the cover hub 5h via a bearing bush 23.

A hollow cylindrical stator shaft 12 is disposed over the periphery of the output shaft 10 to support the hub 4h of the stator impeller 4 (hereinafter referred to as "the stator hub 4h") via a free wheel 11. A bearing bush 13 is interposed between the output shaft 10 and the stator shaft 12 to allow the relative rotation between the output shaft 10 and the stator shaft 12. The outer end portion of the stator shaft 12 is unrotatably supported by a transmission case 14.

The free wheel 11 includes: an outer race 15 which is connected by press fitting to the inner circumferential surface of the stator hub 4h; an inner race 16 which is spline-connected to the periphery of the stator shaft 12; and a group of annularly arranged sprags 17 which are interposed between the races 15 and 16. The stator impeller 4 is made of light metal such as an Al alloy. The outer race 15 press-fitted to the inner circumferential surface of the stator hub 4h is made of steel. An end wall 27 supports one end surface of the outer race 15. The end wall 27 is formed integrally with the stator hub 4h to face one end surface of the group of sprags 17. A thrust needle bearing 29 is interposed between the end wall portion 27 and a pump hub 2h of the pump impeller 2.

Within the stator hub 4h, there is disposed a holding plate 28 which abuts against the outer end surface of the outer race 15 and faces the other end surface of the group of sprags 17, and a thrust needle bearing 29' is interposed between the holding plate 28 and the turbine hub 3h.

At the periphery of the stator shaft 12, there is disposed an auxiliary driving shaft 20 relatively rotatably connected to the pump impeller 2. An oil pump 21 which supplies the working oil to the torque converter T is driven by the auxiliary driving shaft 20.

Defined in the turbine impeller 3 and the transmission cover 5, is a clutch oil chamber 22 in communication with the circulation circuit 6 in the peripheral portion. A lockup clutch L capable of directly connecting together the turbine impeller 3 and the transmission cover 5 is provided in the clutch oil chamber 22. That is, a clutch piston 25 which is the main component of the lockup clutch L is disposed in the clutch oil chamber 22 so as to divide the clutch oil chamber 22 into an inner chamber 22a on the turbine impeller 3 side and an outer chamber 22b on the transmission cover 5 side.

A clutch piston 25 comprises: a cylindrical rim portion 25a which comes close to the inner circumferential surface of the peripheral wall portion 5a of the transmission cover 5; a peripheral annular sidewall portion 25b which is bent at a right angle radially inward from the outer end of the rim portion 25a; a conical sidewall portion 25c which comes close to the turbine impeller 3 as it extends from the inner circumferential end of the peripheral sidewall portion 25b toward the center side; an inner circumferential annular sidewall portion 25d which extends radially inward from the inner circumferential end of the conical sidewall portion 25c, in parallel to the peripheral annular sidewall portion 25b; and a piston hub 25h which is welded to the inner circumferential end of the inner circumferential annular sidewall portion 25d. The clutch piston 25 is disposed as close to the outer surface of the turbine impeller 3 as possible. Also, the above-described peripheral annular sidewall portion 5b, conical sidewall portion 5c and inner circumferential annular sidewall portion 5d of the transmission cover 5 are respectively disposed close to and opposed to the peripheral annular sidewall portion 25b, conical sidewall portion 25c and inner circumferential annular sidewall portion 25d of the clutch piston 25.

On the outer surface of the peripheral annular sidewall portion 25b of the clutch piston 25, an annular friction lining 36 opposed to the above-described driving friction surface 35 is formed by bonding. The clutch piston 25 is supported with the piston hub 25h being slidable on the peripheral surface of the turbine hub 3h so that the piston hub 25h can move between a connection position in which the friction lining 36 is brought into pressure contact with the driving friction surface 35 and a non-connection position in which the friction lining 36 is separated from the driving friction surface 35.

Figure 3:
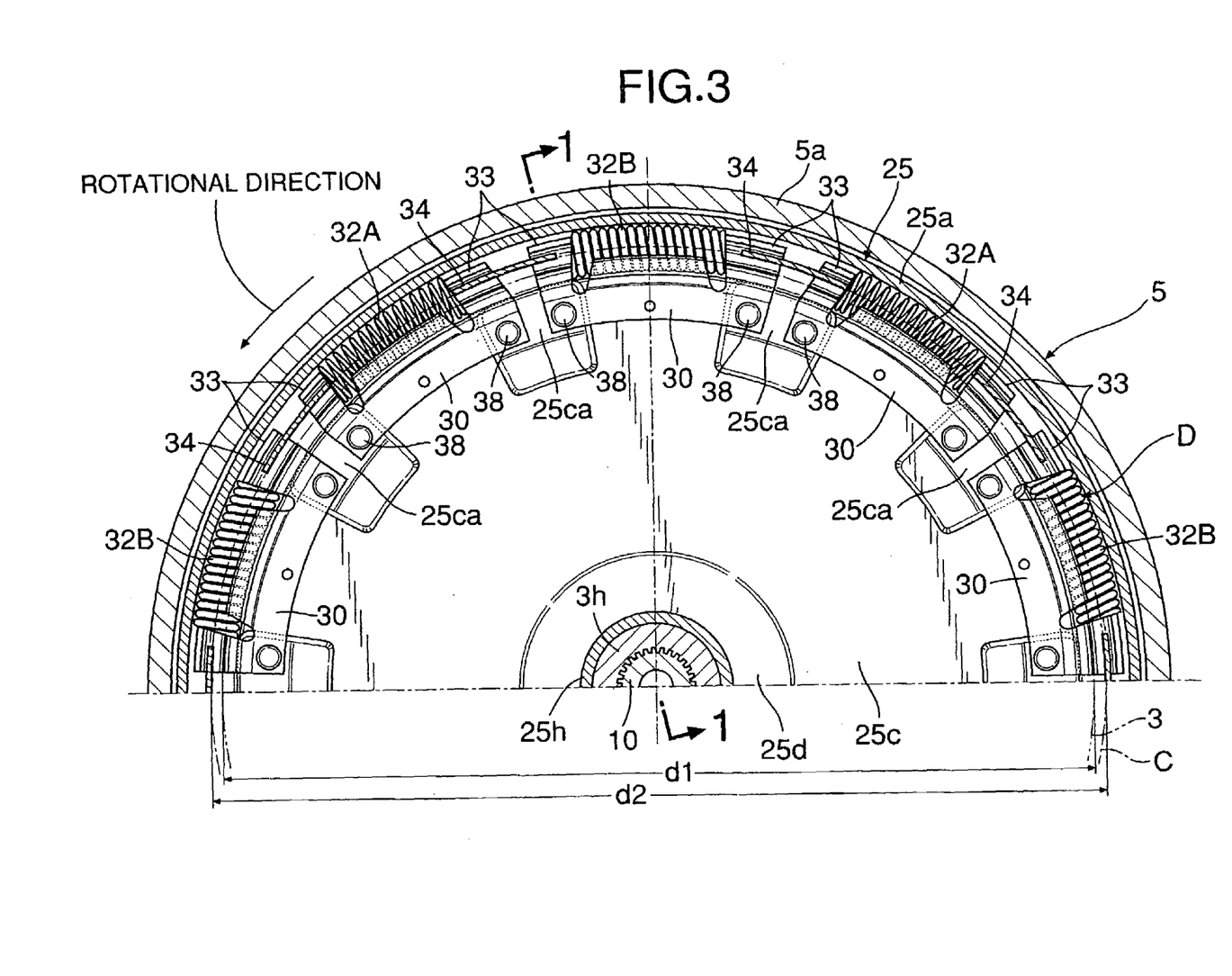
FIG. 3 is a sectional view taken along the line 3-3 of FIG. 1.

As shown in FIGS. 1 and 3, in the clutch oil chamber 22, a publicly known torque tamper D is disposed to connect together the clutch piston 25 and the turbine impeller 3 in a shock-absorbing manner. The torque tamper D includes: a rim portion 25a of the clutch piston 25; plural damper springs 32A, 32A, 32B, 32B which are annularly arranged on the radial inner side of the rim portion 25a and formed from coil springs; plural circular arc spring holding members 30 which are annularly arranged to hold the inner circumference side of the damper springs 32A, 32A, 32B, 32B and firmly fixed to the clutch piston 25 respectively by a pair of rivets 38, 38. In the peripheral portion of the above-described conical sidewall portion 25c of the clutch piston 25, a flat portion 25ca is partially formed to firmly fix each of the spring holding members 30 by the rivets 38, 38.

The damper spring 32A is formed from a relatively thin wire material and has a relatively low spring constant, whereas the damper spring 32B is formed from a relatively thick wire material and has a relatively high spring constant. The damper spring 32A and the damper spring 32B are alternately arranged in the circumferential direction of the rim portion 25a.

First transmission claws 33 are integrally formed in the end portions of the adjacent spring holding members 30 which end portions are opposed to each other, to be inserted in between the adjacent damper springs 32A and 32B. Along with the first transmission claws 33, plural second transmission claws 34A, 34A, 34B, 34B are welded to the peripheral surface of the turbine impeller 3, to be interposed in between the damper springs 32A and 32B. In this case, in a set state, each of the damp springs 32A, 32B is provided under compression with a preset load between the adjacent first transmission claws 33 and 33. Some of the second transmission claws 34A abut against the damper spring 32A of low spring constant and are arranged so as to be spaced a prescribed distance from the damper spring 32B of high spring constant, whereas the other second transmission claws 34B abut against the damper spring 23B of high spring constant and are arranged so as to be spaced a prescribed distance from the damper spring 32A of low spring constant.

All the components of the torque converter T are arranged so that the diameter d2 of the annular arrangement circle connecting the centers of the annularly arranged plural damper springs 32A, 32B is larger than the outer diameter d1 of the turbine impeller 3.

Referring again to FIG. 1, in the center part of the output shaft 10, there is provided a first oil passage 40 which communicates with the outer chamber 22b of the clutch oil chamber 22 via a lateral hole 24 and a thrust needle bearing 26. Also, between the auxiliary driving shaft 20 and the stator shaft 12, there is defined a second oil passage 41 which communicates with the inner circumferential portion of the circulation circuit 6 via the thrust needle bearing 26. The first oil passage 40 and second oil passage 41 are adapted to be alternately connected to the discharge side of the oil pump 21 and an oil reservoir 43 by a lockup control valve 42.

Next, the operation of the present embodiment will be described.

In an idling or extremely low speed operation range of the engine, as shown in FIG. 1, the lockup control valve 42 is controlled by an electronic control unit, which is not shown, so as to connect the first oil passage 40 to the discharge side of the oil pump 21 and connect the second oil passage 41 to the oil reservoir 43. Therefore, when an output torque of the crankshaft 1 of the engine is transmitted to the driving plate 8, the transmission cover 5 and the pump impeller 2, drives and rotate the pump impeller 2 and further drives the oil pump 21, the working oil discharged from the oil pump 21 flows from the lockup control valve 42, sequentially through the first oil passage 40, the lateral hole 24, the thrust needle bearing 26, the outer chamber 22b and inner chamber 22a of the clutch oil chamber 22, into the circulation circuit 6. After filling the circuit 6, the working oil flows through the thrust needle bearing 29 into the second oil passage 41, and flows back through the lockup control valve 42 into the oil reservoir 43.

In the clutch oil chamber 22, the pressure in the outer chamber 22b becomes higher than the pressure in the inner chamber 22a due to the above-described flow of the working oil, so that the pressure difference therebetween presses the clutch piston 25 in a direction away from the driving friction surface 35 of the transmission cover 5, resulting in that the lockup clutch L enters a non-connection state, thereby allowing the relative rotation between the pump impeller 2 and the turbine impeller 3. Therefore, when the pump impeller 2 is rotationally driven from the crankshaft 1, the working oil filling the circulation circuit 5 circulates as indicated by the arrow, whereby the working oil transmits the rotational torque of the pump impeller 3 to the turbine impeller 4 to drive the output shaft 10.

If, at this time, an amplification action of the torque occurs between the pump impeller 2 and the turbine impeller 3, a reaction force caused by the amplification action becomes a load on the stator impeller 4. The stator impeller 4 is locked between the outer race 15 and the inner race 16, because of the locking action of the free wheel 11, that is, because the group of sprags 17 impedes the relative rotation of the two races, 15, 16, whereby the stator impeller 4 is connected and fixed to the stator shaft 12.

After the completion of the torque amplification action, because the free wheel 11 idles due to the reversing of the direction of the torque received by the stator impeller 4, that is, because the group of sprags 17 allows the relative rotation of the two races 15, 16, the stator impeller 4, along with the pump impeller 2 and the turbine impeller 3, begins to rotate in the same direction.

When the torque converter T has been brought into such a coupled state, the lockup control valve 42 is changed over by the electronic control unit. As a result, in contrast to the above-described action, the working-oil discharged from the oil pump 21 flows from the lockup control valve 42 into the circulation circuit 6 via the second oil passage 41, fills the circuit 6, moves into the inner chamber 22a of the clutch oil chamber 22 to also fill the inner chamber 22a. On the other hand, because the outer chamber 22b of the clutch oil chamber 22 is open to the oil reservoir 43 via the first oil passage 40 and the lockup control valve 42, the pressure in the inner chamber 22a becomes higher than the pressure in the outer chamber 22b in the clutch oil chamber 22, so that the pressure difference therebetween presses the clutch piston 25 toward the transmission cover 5 side to bring the friction lining 36 into pressure contact with the driving friction surface 35 of the transmission cover 5, whereby the lockup clutch L enters a connected state. Then, the rotational torque transmitted from the crankshaft 1 to the pump impeller 2 is mechanically transmitted from the transmission cover 5, through the clutch piston 25 and the torque damper D, to the turbine impeller 3. Therefore, the pump impeller 2 and the turbine impeller 4 enter a direct connected state, thereby efficiently transmitting the output torque of the crankshaft 1 to the output shaft 10 to reduce the fuel cost. In this case, if a torque variation occurs between the pump impeller 2 and the turbine impeller 3, regardless of the acceleration or deceleration of the engine, the damper spring 32A of low spring constant is first compressed between the first transmission claw 33 and the second transmission claw 34A; and when the amount of the compression becomes a predetermined value or more, the damper spring 32B of high spring constant is compressed between the first transmission claw 33 and the second transmission claw 34A. In this way, by absorbing stepwise the torque shock, it is possible to efficiently absorb even a large torque shock by a relatively small angular displacement between the pump impeller 2 and the turbine impeller 3.

During the operation of the torque converter T, a large radial load is applied by centrifugal force and inner pressure to the pump shell 2s and transmission cover 5, particularly to their diameter-expanded portion 2sa and peripheral wall portion 5a, so that stress is likely to concentrate on the fillet weld 52 between the pump shell 2s and transmission cover 5. However, the annular recess 48 is provided on the inner circumferential surface of the peripheral wall portion 5a of the transmission cover 5 to constitute the annular thin-walled portion 49 adjoining the female fitting surface 47 on the side opposite from the fillet weld 52. Therefore, the annular thin-walled portion 49 deflects to an appropriate degree, and the stress is distributed from the fillet weld 52 to the annular thin-walled portion 49, thereby efficiently alleviating the concentration of excessive stress on the fillet weld 52. That is, the durability of the pump shell 2s and the transmission cover 5 can be improved without increasing their plate thickness.

Further, a decrease in the wall thickness of the peripheral wall portion 5a does not occur in the female fitting surface 47 adjoining the annular thin-walled portion 49, and therefore it is possible to obtain a sufficient welding margin of the fillet weld 52 to increase the strength of the fillet weld 52.

Because the two inner side surfaces and bottom surface of the recess 48 constitute a continuous curved surface, the stress is distributed over the whole thin-walled portion 49, thereby preventing a decrease in the strength of the annular thin-walled portion 49.

In the end portion of the diameter-expanded portion 2sa of the pump shell 2s, a cylindrical covering wall 50 is provided to cover the recess 48 from the inner circumference side, with the interior thereof serving as a pouched foreign matter trap 51 which communicates with the clutch oil chamber 22 on the tip end side of the covering wall 50. Therefore, by using the recess 48 as the foreign matter trap 51, it is possible to capture the foreign smatter centrifugally separated from the working oil during the operation of the torque converter T.

Further, since an annular scraped-wall portion 50a facing the recess 48 is formed in the peripheral surface of the covering wall 50, it is possible to increase the volume of the foreign matter trap 51.

Furthermore, a ring gear 7 is fitted and welded between the annular thin-walled portion 49 and the peripheral annular sidewall portion 5b of the transmission cover 5, on the peripheral surface of the peripheral wall portion 5a of the transmission cover 5. Therefore, it is possible to use the peripheral wall portion 5a as a mounting portion for the ring gear 7 and to prevent the thermal distortion of the annular thin-walled portion 49 due to the welding of the ring gear 7.

The transmission cover 5 includes a conical sidewall portion 5c which connects together the annular sidewall portion 5b having the driving friction surface 35 formed thereon and the cover hub 5h and which comes closer to the turbine impeller 3 in a direction from the peripheral annular sidewall portion 5b to the cover hub 5h, and there is no annular step therebetween. Therefore, even in a case where transmission cover 5 is formed to have a large diameter in order to accommodate a large-capacity lockup clutch L and a torque damper D, it is possible to minimize the axial swelling deformation of the transmission cover 5 due to the interior high oil pressure and to effectively avoid stress concentration.

In addition, not only a conical recess 5f defined by the outer surface of the conical sidewall portion 5c receives the end portion of the crankshaft 1, but also the deepest portion of the recess 5f particularly receives the head of a bolt 9 which connects the driving plate 8 to the end surface of the crankshaft 1. Therefore, by adopting a relatively tall head of the bolt 9, it is possible to shorten the axial dimension of an assembly including the torque converter T and the engine while ensuring a large force for tightening the driving plate 8 to the crankshaft 1, thereby contributing to the compact design of the assembly.

The cap-shaped cover hub 5h has a closed tip end portion which projects axially outward from the outer surface of the peripheral annular sidewall portion 5b and which is fitted into a pouched positioning hole 1a in the central part of the end surface of the crankshaft 1. Therefore, in cooperation with the end portion of the crankshaft 1 projecting into the recess 5f, it is possible to ensure a sufficient fitting depth of the cover hub 5h into the positioning hole 1a.

The clutch piston 25 of the lockup clutch L includes a conical sidewall portion 25c which connects together the annular sidewall portion 25b having the annular friction lining 36 formed thereon and the cover hub 25h and which has a conical angle substantially same as that of the conical sidewall portion 5c of the transmission cover 5. Therefore, it is possible to arrange the transmission cover 5, together with the clutch piston 25, as close to the turbine impeller 3 as possible, thereby achieving the compact design of the torque converter T.

Furthermore, because the conical sidewall portion 5c is provided in the transmission cover 5, it is possible to obtain a relatively large annular space on the inner side of the peripheral portion of the transmission cover 5 so as not to be interfered with by the turbine impeller 3; and by using the space, it is possible to dispose the friction engaging portion of a relatively large-capacity lockup clutch L and a torque damper D.

The present invention is not limited to the above-described embodiment and various design changes can be made thereto without departing from the subject matter of the invention.

What is claimed is:

1. A fluid transmission device comprising:
   a turbine impeller;
   a pump impeller which is opposed to the turbine impeller so as to define a circulation circuit of a working oil between the pump impeller and the turbine impeller, and which has a pump shell including a diameter-expanded portion along a peripheral end portion; and
   a cylindrical transmission cover which defines an oil chamber in communication with the circulation circuit between the transmission cover and a back surface of the turbine impeller, a male fitting surface of a periphery of the diameter-expanded portion being fitted to a female fitting surface of an inner circumference of a peripheral wall portion of the cylindrical transmission cover, a fillet weld being formed between an end surface of the peripheral wall portion and a peripheral surface of the diameter-expanded portion along an entire circumference thereby connecting together the pump shell and the transmission cover, wherein an annular recess is formed in an inner circumferential surface of the peripheral wall portion to adjoin the female fitting surface on the side opposite from the fillet weld, and wherein a portion of the transmission cover corresponding to the recess constitutes an annular thin-walled portion which has a thickness smaller than that of the portions of the transmission cover on the opposite sides of the annular thin-walled portion.

2. A fluid transmission device according to claim 1, further comprising an annular covering wall which covers the recess from the inner circumference side so as to define a pouched foreign matter trap which communicates with the oil chamber on a tip end side of the covering wall.

3. A fluid transmission device according to claim 1, wherein opposite inner side surfaces and bottom surface of the recess constitute a continuous curved surface.

4. A fluid transmission device according to claim 2, wherein an annular scraped-wall portion is formed along a peripheral surface of the covering wall to face the recess.

5. A fluid transmission device according to any one of claims 1 to 4, wherein a ring gear is fitted and welded to each other on an peripheral surface of the peripheral wall portion between the annular thin-walled portion and a sidewall portion of the transmission cover.

6. A fluid transmission device according to claim 5, wherein a driving plate connected to a crankshaft of an engine is connected to the ring gear.

7. A fluid transmission device according to claim 1, wherein the turbine impeller further includes a turbine hub to which an output shaft coaxial with the crankshaft is connected, wherein the transmission cover further includes a cover hub coaxial with the output shaft, wherein a crutch oil chamber is defined between the turbine impeller and the transmission cover to communicate with the circulation circuit, wherein a lockup clutch is disposed in the crutch oil chamber and includes: an annular driving friction surface formed on an inner sidewall peripheral portion of the transmission cover; a crutch piston which has a piston hub rotatably and axially slidably supported on the turbine hub of the turbine impeller, and an annular sidewall portion having an annular follower friction surface that is formed on its inner surface and that can engage with and disengage from the driving friction surface; and a torque damper which has a plurality of damper springs annularly arranged to adjoin the annular sidewall portion of the crutch piston and which provides a shock-absorbing connection between the crutch piston and the turbine impeller, wherein the transmission cover further includes a conical sidewall portion which connects together the annular sidewall portion having the driving friction surface formed thereon and the cover hub and which comes closer to the turbine impeller in a direction from the annular sidewall portion to the cover hub, and wherein an outer side surface of the conical sidewall portion defines a conical recess for receiving an end of the crankshaft.

8. A fluid transmission device according to claim 7, wherein the crutch piston further includes a conical sidewall portion which connects together the annular sidewall portion having the driving friction surface formed thereon and the cover hub and which has a conical angle substantially same as that of the conical sidewall portion of the transmission cover.

9. A fluid transmission device according to claim 7 or 8, wherein a diameter of an annular arrangement circle connecting centers of the plurality of annularly arranged damper springs is larger than an outer diameter of the turbine impeller.

* * * * *